United States Patent
Shimizu et al.

[19]

[11] Patent Number: 6,154,615
[45] Date of Patent: Nov. 28, 2000

[54] CAMERA

[75] Inventors: Saori Shimizu, Hachioji; Tetsuo Miyasaka, Kamiina-gun; Yoshinori Matsuzawa, Hachioji, all of Japan

[73] Assignee: Olympus Optical Co., Ltd., Tokyo, Japan

[21] Appl. No.: 09/325,828

[22] Filed: Jun. 4, 1999

[30] Foreign Application Priority Data

Jun. 10, 1998 [JP] Japan .................................. 10-162175

[51] Int. Cl.$^7$ .................................................. G03B 17/48
[52] U.S. Cl. ........................ 396/263; 396/374; 396/429; 348/64
[58] Field of Search .................................. 396/263, 374, 396/429, 430; 348/64

[56] References Cited

U.S. PATENT DOCUMENTS

| | | | |
|---|---|---|---|
| 5,774,754 | 6/1998 | Ootsuka .............................. | 396/374 X |
| 5,950,031 | 9/1999 | Yamagata ................................ | 396/429 |
| 5,978,016 | 11/1999 | Lourrette et al. ......................... | 348/64 |

FOREIGN PATENT DOCUMENTS

| | | |
|---|---|---|
| 61-215538 | 9/1986 | Japan . |
| 10-83023 | 3/1998 | Japan . |

*Primary Examiner*—W. B. Perkey
*Attorney, Agent, or Firm*—Frishauf, Holtz, Goodman, Langer & Chick, P.C.

[57] ABSTRACT

To enable the user of the camera to select, using a simple mechanism, one of a function for simultaneously performing photographing and electronic image pickup, and a function for performing only one of the photographing and the electronic image pickup, the camera incorporates a release button at a position which, for example, the index finger of the right hand can reach, and another button, i.e. a digital button, at a location which the thumb of the right hand can reach. The camera is operated in accordance with a predetermined control program so that the above-described operations can be selectively executed by appropriately operating the release button and the digital button. In other words, the invention provides a camera that permits the user to easily select, using only one hand, only electronic image pickup, only film exposure, or simultaneous execution of both the operations.

11 Claims, 5 Drawing Sheets

CAMERA

BACKGROUND OF THE INVENTION

This invention relates to a camera which is obtained by adding an electronic image pickup device to a camera using a silver film, and which can pick up an electronic image using an image pickup element incorporated in the pickup device.

There are conventional single-lens reflex cameras for picking up, using an electronic image pickup element, an electronic image corresponding to part of light or the entire light reflected from a movable mirror, and displaying its output on a monitor device.

Japanese Patent Application KOKAI Publication No. 61-215538 discloses one of the single-lens reflex cameras. In this camera, for example, a half mirror is provided across the optical path of a finder thereof for guiding part of light reflected from a to-be-photographed object, to a CCD as the electronic image pickup element, where the guided light is displayed. Further, image pickup data is sequentially stored in a memory incorporated in the camera, and the contents of photography can be easily and promptly confirmed without the DPE process of a silver film. Moreover, in the camera, exposure of the silver film and image pickup by the image pickup element are simultaneously performed by operating a release button.

However, the conventional cameras are disadvantageous in that even when the user wishes to use the camera just as an image memorandum, exposure of the film is simultaneously performed, thereby wasting the film. At this time, extra power is inevitably used for the unnecessary film exposure.

BRIEF SUMMARY OF THE INVENTION

The present invention has been developed in light of the above-mentioned disadvantage, and is aimed at providing a camera that enables the user to select, using a simple mechanism, one of a function for simultaneously performing photography and electronic image pickup, and a function for performing only one of photography and electronic image pickup.

To attain the aim, the camera is provided with a release button and another button for instructing the camera to perform electronic image pickup operation, and is controlled such that it can select one of three functions for executing only electronic image pickup, only silver film exposure, and both the operations, on the basis of the operation of the aforementioned another button, or on the basis of a combination of the operation of the button and a signal generated when the release button is half pushed, or a signal generated when the release button is completely pushed.

According to an aspect of the invention, there is provided a camera including photographing means for exposing a silver film to light to photograph a to-be-photographed object, and electronic image pickup means having an image pickup element for receiving light indicative of the object and storing it as image data, characterized in that a plurality of operation members are further included, and the photographing means and the electronic image pickup means are selectively operated in accordance with a combination of operations of the plurality of operation members.

According to another aspect of the invention, there is provided a camera including photographing means for exposing a silver film to light to photograph a to-be-photographed object, and electronic image pickup means having an image pickup element for receiving light indicative of the object and storing it as image data, characterized in that first and second manual operation members are further included, and the control means determines operation states of the photographing means and the electronic image pickup means, depending upon whether or not the second manual operation member is operated when the first manual operation member is operated.

According to a yet another aspect of the invention, there is provided a camera including photographing means for exposing a silver film to light to photograph a to-be-photographed object, and electronic image pickup means having an image pickup element for receiving light indicative of the object and storing it as image data, characterized in that first output means for generating a first manual operation signal and second output means for generating a second manual operation signal are further included, both the photographing means and the electronic image pickup means being operated when both the first and second manual operation signals have been output, only the electronic image pickup means being operated when only the first manual operation signal has been output, and only the photographing means being operated when only the second manual operation signal has been output.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

The embodiments of the invention will be described in detail with reference to the accompanying drawings. First, the technical contents common to the embodiments will be described with reference to FIGS. 1–3.

Figure 1:
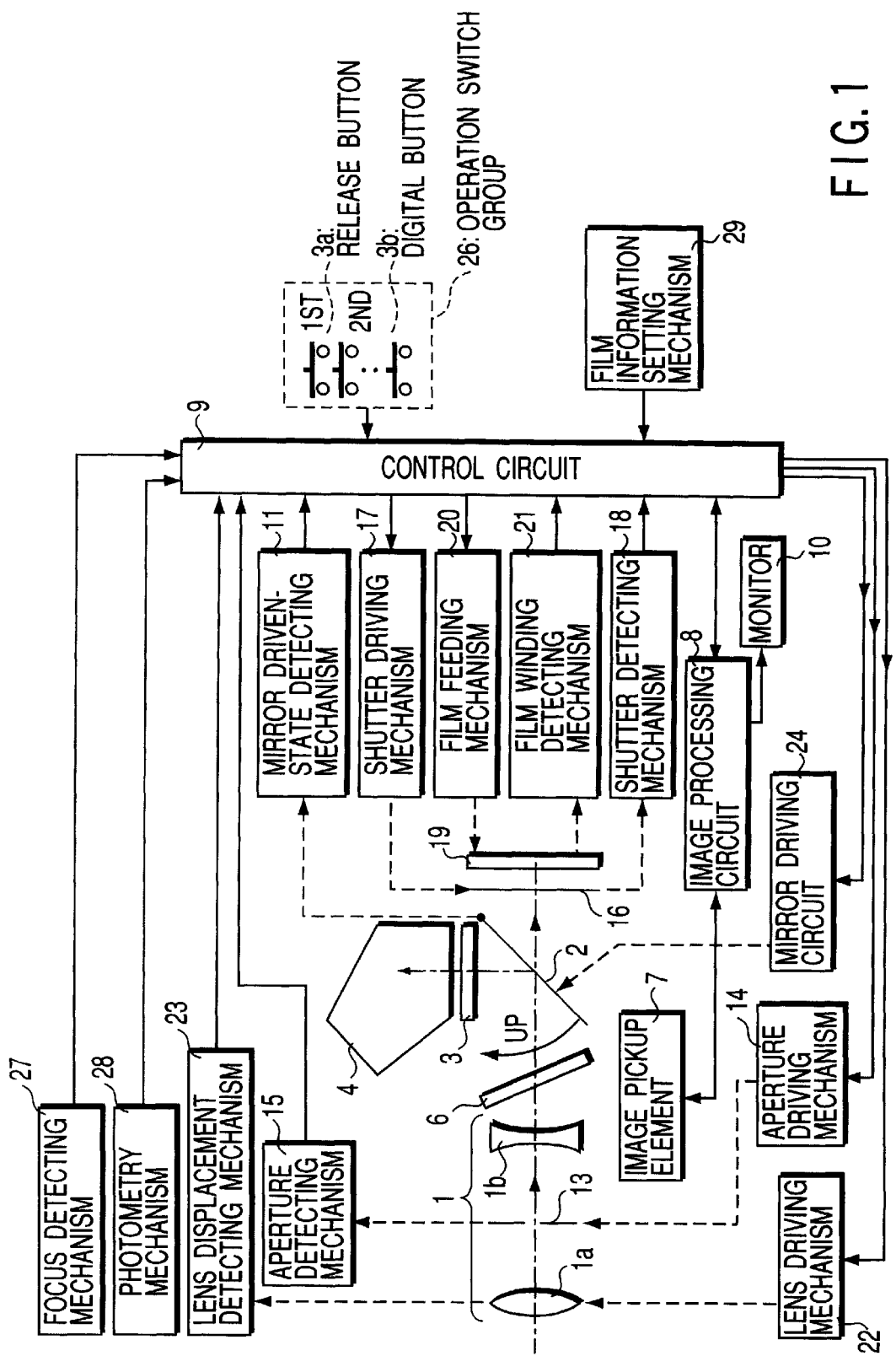
FIG. 1 is a block diagram illustrating functions employed in single-lens reflex cameras according to the embodiments of the invention.

FIG. 1 is a block diagram illustrating functions employed in single-lens reflex cameras according to the embodiments of the invention. These cameras have a control circuit 9 for executing a characterizing control program (which will be described later). The operation sequence of each camera is appropriately controlled by the control circuit 9.

The control circuit 9 is connected to various driving mechanisms (i.e., a lens driving mechanism 22, an aperture driving mechanism 14, a mirror driving mechanism 24, a shutter driving mechanism 17, and a film feeding mechanism 20), that operate in response to control signals output from the output ports of the control circuit 9 also connected to various detecting mechanisms (i.e., a lens displacement detecting mechanism 23, an aperture detecting mechanism 15, a shutter detecting mechanism 18, a film winding detecting mechanism 21, and a mirror-driven-state detecting mechanism 11), for supplying state signals to the inlet ports of the control circuit 9 and further connected to a focus detecting mechanism 27 for detecting a displacement of the focus of a to-be-photographed object, a photometry mechanism 28 for detecting the luminance of the object, a film information setting mechanism 29 for setting the ISO sensitivity and the maximum exposures of a silver film 19, and an image processing circuit 8 for processing an electronic image substantially equivalent to an optical image formed on the silver film 19.

Light reflected from a to-be-photographed object passes through an image pickup lens 1 and reaches a half mirror 6, whereby part of the reflected light is guided to an image pickup element 7, and the other part passes through the half mirror 6, reflects on a movable mirror 2 and reaches a pentagonal prism 4 and an eyepiece section 5 through a screen 3. As a result, the photographer can observe the object.

The image pickup element 7 converts, into analog image data, an image of the to-be-photographed object, which is formed on an image forming surface. The image processing circuit 8 subjects the analog image data from the image pickup element 7 to A/D conversion in response to a control signal from the control circuit 9, thereby creating and storing digital image data and displaying it on a monitor 10 as an electronic view finder.

Further particulars concerning the image processing circuit 8 and its peripheral circuits will be described later.

An aperture member 13 for adjusting the amount of light is located between optical systems la and lb that constitute the image pickup lens 1. The aperture member 13 is driven by the aperture driving mechanism 14. While the aperture member 13 is driven by the aperture driving mechanism 14, the state of the aperture is detected by the aperture detecting mechanism 15, and the control circuit 9 controls the driving degree of the aperture on the basis of a signal output from the aperture detecting mechanism 15.

The aperture detecting mechanism 15 uses a non-contact type sensor such as a photo interrupter, a photo reflector, a hall element, etc. to detect the movements of the members that constitute the aperture driving mechanism 14.

A shutter 16 is arranged to be opened or closed by the shutter driving mechanism 17. Further, the energy used for opening or closing the shutter is also charged by the shutter driving mechanism 17. The charged, open or closed state of the shutter 16 is detected by the shutter detecting mechanism 18, and the control circuit 9 is responsive to a signal from the shutter detecting mechanism 18 for controlling the shutter charging, opening and closing operations.

Like the aperture detecting mechanism 15, the shutter detecting mechanism 18 is formed of a non-contact type sensor.

The silver film 19 is arranged to be wound for (supply new frame) and rewound by the film feeding mechanism 20. The winding amount of the film 19 is detected by the film winding detecting mechanism 21, and the control circuit 9 is responsive to a signal from the film winding detecting mechanism 21 for controlling the winding degree of the film 19.

The film winding detecting mechanism 21 detects the perforation of the silver film 19 using a photo interrupter, a photo reflector, etc.

The focus adjusting optical system la of the image pickup lens 1 is driven by the lens driving mechanism 22, while the displacement of the focus adjusting optical system la is detected by the lens displacement detecting mechanism 23. The control circuit 9 is responsive to a signal from the lens displacement detecting mechanism 23 for controlling the displacement of the focus adjusting optical system la. The lens displacement detecting mechanism 23 detects, using a photo interrupter, the degree of rotation of a toothed rotary member provided at part of a transmission incorporated in the lens driving mechanism 22.

The movable mirror 2 for selectively guiding an optical flux reflected from the object, to the finder eyepiece section 5 and the silver film 19 is retreated upward (as indicated by arrow "UP") before the exposure operation. This movement is caused by the mirror driving mechanism 24 including a motor (not shown) when a corresponding control signal has been output from the control circuit 9. The operation of the movable mirror 24 is detected by the mirror-driven state detecting mechanism 11 that includes detection means such as a "mirror-up" detecting switch, a "mirror-down" detecting switch, etc. In response to a signal from the mirror-driven-state detecting mechanism 11, the control circuit 9 controls the mirror driving mechanism 24.

The control circuit 9 is further connected to a release switch unit (linked with a release button 3a) consisting of first and second release switches, a digital switch (linked with a digital button 3b) for digitally picking up an image, and an operation switch group 26 that includes switches related to various camera operations, such as switches (not shown) provided on the rear surface of the camera. When the release button 3a has been half pushed, the first release switch is turned on (i.e., a first release operation is performed). Then, when the release button 3a has been further pushed, the second release switch is turned on (i.e., a second release operation is performed).

In the above-described camera of the invention, the user can designate any desired functions, i.e. only an electronic image pickup function, only a film exposure function or both of these functions, by operating (pushing) the release switch button 3a and the digital switch button 3b in combination.

Figure 2:
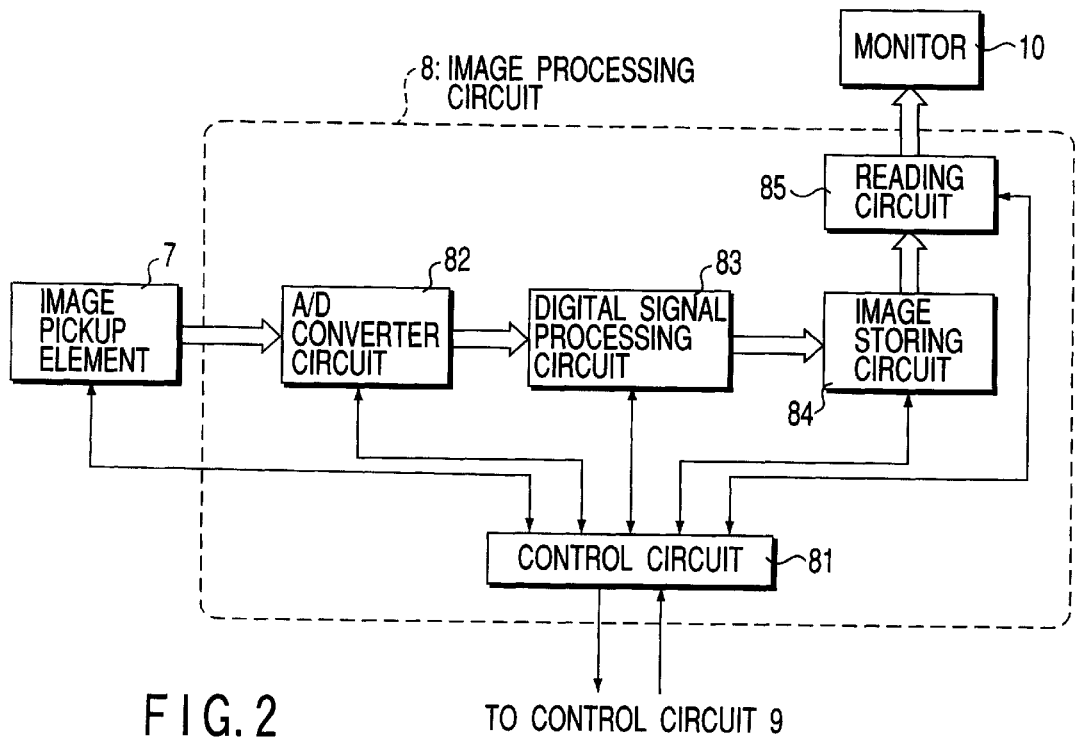
FIG. 2 is a block diagram illustrating in detail an image processing circuit appearing in FIG. 1.

Referring then to FIG. 2, the structure and operation of the aforementioned image processing circuit 8 will be described in detail. As is understood from FIG. 2, the image processing circuit 8 comprises a control circuit 81 for controlling a sequence of image processing operations, an A/D converter circuit 82 for subjecting the output of the image pickup element 7 to A/D conversion, a digital signal processing circuit 83 for processing the output of the A/D converter circuit 82 to thereby create image data suitable for monitor display, an image storage circuit 84 for storing the output of the digital signal processing circuit 83, and a reading circuit 85 for reading image data stored in the image storing circuit 84 and displaying it on the monitor as an electronic view finder.

The control circuit 81 is adapted to control two image processing operations, i.e. an analog image data pickup operation and a digital image data storage/display operation. In the analog data pickup operation, the control circuit 81 causes the image pickup element 7 to start an integration operation, upon receiving a predetermined signal instructing pickup of an image from the control circuit 9, and supplies the control circuit 9 with a predetermined signal indicative of the completion of the image pickup upon receiving a predetermined signal indicative of the completion of the integration operation from the image pickup element 7.

In the storage/display operation, the control circuit 81 performs the following processing. Upon receiving, from the control circuit 9, a signal instructing the camera to perform the storage/display of an image, the control circuit 81 causes the A/D converter circuit 82 to convert the output of the image pickup element 7 into digital data. Upon receiving a signal indicative of the completion of the A/D conversion from the A/D converter circuit 82, the control circuit 81 causes the digital signal processing circuit 83 to perform image data processing. Then, upon receiving a signal indicative of the completion of the processing from the digital signal processing circuit 83, the control circuit 81 causes the image storing circuit 84 to store the output of the digital signal processing circuit 83. Upon receiving a signal indicative of the completion of the storing operation from the image storing circuit 84, the control circuit 81 causes the reading circuit 85 to read image data stored in the image storing circuit 84 and then to display it on the monitor 10. Lastly, upon receiving a signal indicative of the completion of the display operation from the reading circuit 85, the control circuit 81 supplies the control circuit 9 with a signal indicative of the completion of the storage/display.

As described above, the image processing circuit 8 stores an image obtained by processing the output of the image pickup element 7 under the control of the control circuits 81 and 9, and displays it on the monitor 10.

Figure 3:
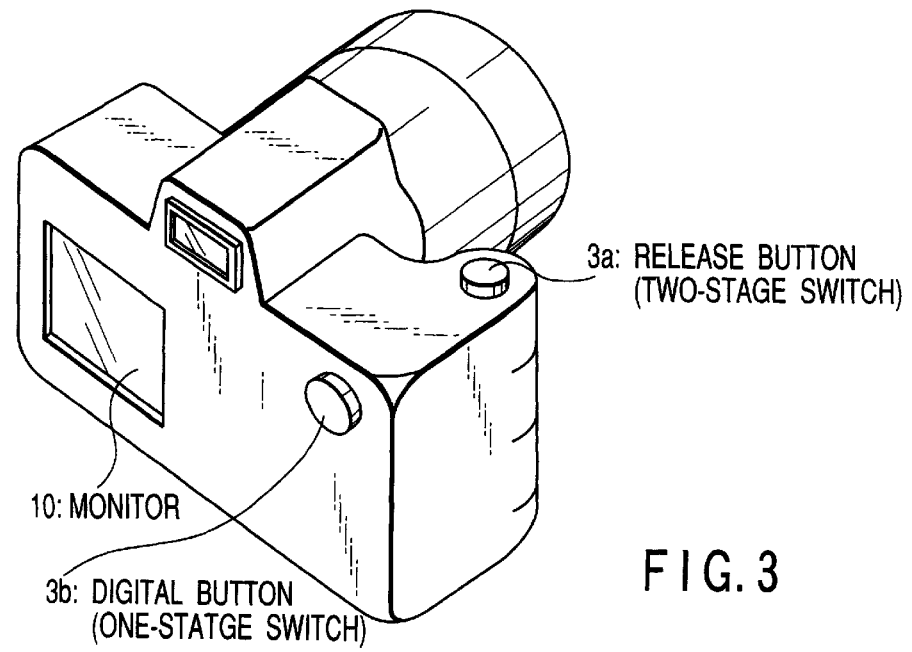
FIG. 3 is a common perspective view of the cameras of the invention.

FIG. 3 is a perspective view of the outward appearance of the camera of the invention, taken when viewed from diagonally behind.

The release button 3a is provided on the upper surface of a forwardly protruding grip section located on the upper right side of the camera, at an appropriate location which the index finger of the user's right hand can reach when the grip section is gripped in the right hand. Further, the other digital button 3b is provided on the rear surface of an upper right section of the camera, at an appropriate location which the user's thumb can reach and at which it is easy to operate both the release button 3a and the digital button 3b. In other words, the buttons 3a and 3b have a positional relationship that corresponds to the human hand's anatomy.

The power switch SW (not shown), for example, of the camera is also operation means included in the operation switch group 26 (see FIG. 1).

The monitor 10 for monitor display is provided at a location at which the user can see it easily. More specifically, the monitor 10 is fitted in, for example, a lower left, rear surface of the camera as shown in FIG. 3.

Since the monitor 10 also serves as an "electronic view finder", the user can observe not only an optical image through an optical finder as in the conventional case, but also an electronic image formed by the CCD without bringing their eye into contact with the finder.

As stated above, the user can easily designate any desired operation, for example, only electronic image pickup, only film exposure, or both of these operations, simply by appropriately operating the release switch (button 3a) and the digital switch (button 3b) of the operation switch group 26 with the thumb and index finger of the right hand.

The structure described above with reference to FIGS. 1–3 is commonly employed in cameras according to the following three embodiments.

The three embodiments will be described in order with reference to the flowcharts (FIGS. 4–6) that illustrate control programs employed therein.

(First Embodiment)

Figure 4:
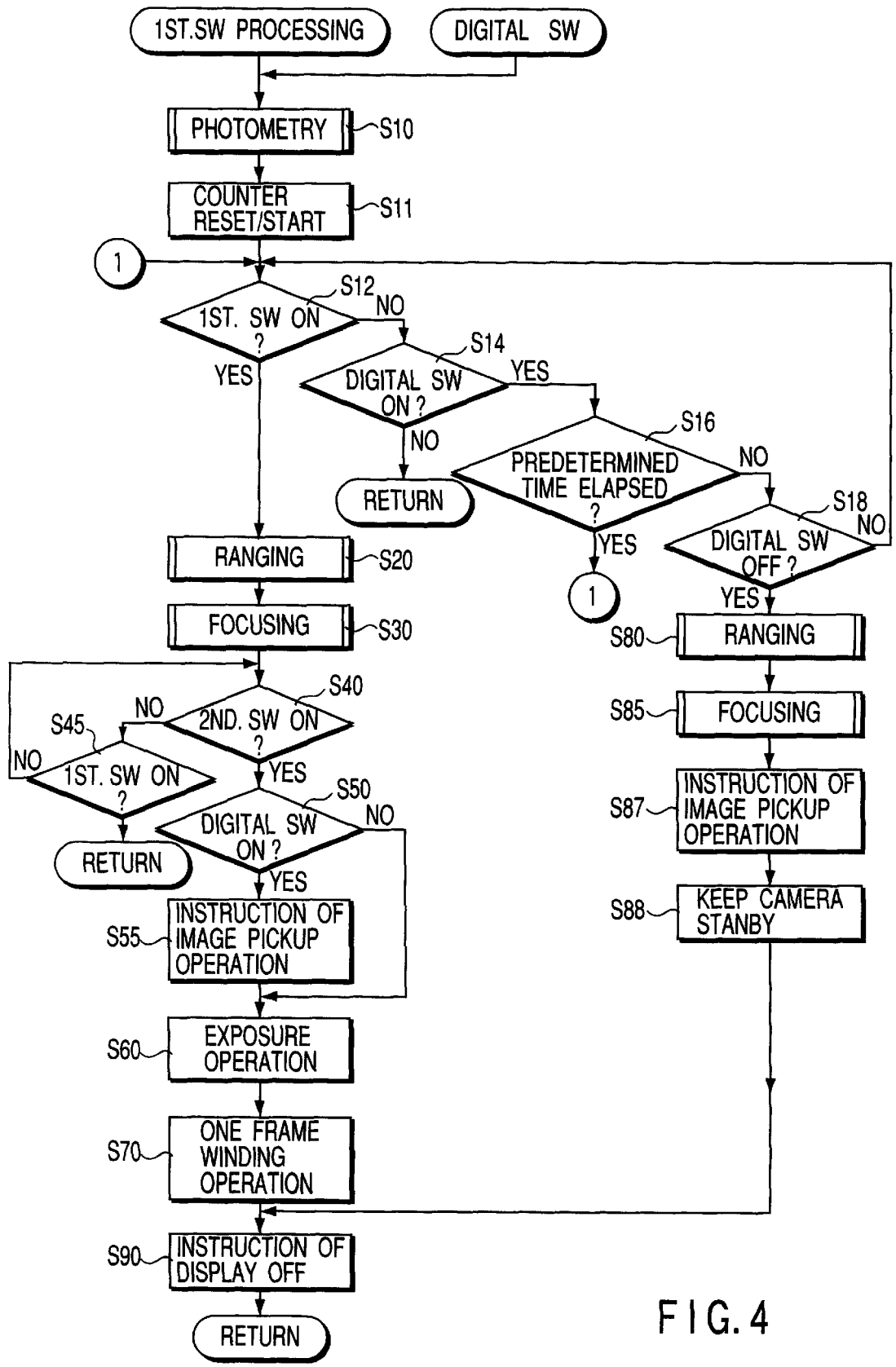
FIG. 4 is a flowchart useful in explaining the operation of the camera of the first embodiment.

FIG. 4 is a flowchart useful in explaining the operation of a camera according to a first embodiment of the invention. When the power SW has been turned on, a control program (main routine) installed in a control circuit is executed to monitor the operations of the release button and the digital button.

When the first release switch or the digital switch has been turned on in the main routine of the camera operation sequence (not shown), "photometry" of a to-be-photographed object is performed for photography or image pickup (S10), and then the timer is reset (S11).

It is determined at a step S12 whether or not the first release switch is in the ON state. If it is in the ON state, "ranging" (i.e. the distance to the to-be-photographed object is measured) is performed for photography (S20). After that, "focusing" (i.e. the lenses are driven to bring the object into focus) is performed (S30).

Subsequently, it is determined at a step S40 whether or not the second release switch is in the ON state. If it is not in the ON state, it is again determined whether or not the first release switch is in the ON state. If the first release switch is in the ON state, the program returns to the step S40, whereas if it is not in the ON state, the program returns to the main routine.

On the other hand, if it is determined at the step S40 that the second release switch is in the ON state, it is determined at a step S50 whether or not the digital switch is in the ON state. If it is in the ON state, an image pickup operation (which includes a data storage operation and a display operation) for pickup of an electronic image is instructed to be performed at a step S55. If, on the other hand, the digital switch is not in the ON state, the program proceeds to a step S60.

At the step S60, a predetermined exposure operation is performed, and the film is wound by one frame (S70), followed by the program proceeding to a step S90.

If it is determined at the step S12 that the first release switch is not in the ON state, it is determined at a step S14 whether or not the digital switch is in the ON state. If it is not in the ON state, the program returns to the main routine. If, on the other hand, it is determined at the step S14 that the digital switch is in the ON state, it is determined by the timer at a step S16 whether or not a predetermined period in time, for example, about 200–500 msec. has elapsed. If it is determined that the period in time has elapsed, the program returns to the step S12, where the sane processing as above is performed. If the period in time has not yet elapsed, it is determined whether or not the digital switch has been turned off. If it is determined that the digital switch has not yet been turned off, the program returns to the step S12, and the same processing as above is performed. If the digital switch has been turned off, the program proceeds to a step S80.

At the step S80, the "ranging" of an object, whose "photometry" has already been finished, is performed, thereby driving the lens system to bring the object into focus at a step S85, instructing performing of the image pickup operation for electronic image pickup at a step S87, causing the camera to keep standby for a predetermined period in time of e.g. about 1–3 sec. at a step S88, and followed by the program proceeding to a step S90.

At the step S90, an instruction to delete the data presently displayed on the monitor is made, and then the program returns to the main routine.

To perform exposure, after a mirror-up operation is executed to raise the movable mirror, predetermined control is performed in synchronism with the mechanical control that is executed in the single-lens reflex camera. Specifically, predetermined aperture/shutter control for exposure is performed immediately after the mirror-up operation, and then a mirror-down operation is carried out to return the mirror to the original position.

(Advantage 1)

The monitor-equipped camera according to the embodiment is constructed such that since the release button and the digital button, which can be pushed by the index finger and the thumb of the right hand, respectively, are provided on the camera main body, one of three functions for, for example, executing only electronic image pickup, only silver film exposure and both the operations can be selected by appropriately combining the operations of the two buttons. Thus, any of the functions can be executed simply by using the right hand (i.e. pushing the release button with the index finger and the digital button with the thumb). In other words, since the two buttons have a positional relationship that corresponds to the human hand's anatomy, the button operations are very easy and convenient to perform on a quick decision by the user, as compared with the conventional camera in which mode switches corresponding to the buttons are provided in different positions therefrom. Also, each of the aforementioned three functions can be executed by performing a corresponding combination of button operations without recognizing or displaying the present mode, which is necessary in the conventional camera, and with the camera directed to a to-be-photographed object. In particular, operating the release button and the digital button in accordance with the control program used in the first embodiment enables execution of the following three functions:

First, the "photometry" is performed by pushing, using the index finger, the release button to thereby turn on the first release switch, or by pushing the digital button. Then, the combination of operations of the first and second release switches linked with the release button and the digital switch linked with the digital button is determined. If it is determined that only the digital switch has been pushed for a predetermined period in time, it is judged that an electronic image pickup should be performed, thereby picking up and storing an electronic image of a to-be-photographed object. If it is determined that the digital switch is not pushed and the second release switch is being pushed, it is judged that only exposure of a silver film should be performed, thereby photographing the object.

If the digital switch and the second release switch are being simultaneously pushed, it is judged that both the exposure of the film and the pickup of an electronic image should be performed, thereby doing so. Image pickup as a result of pushing the digital button is controlled by the program so that the pickup operation is actually performed immediately after the finger is separated from the button. This time lag is substantially the same as that which will occur when performing operations using a mouse or a key in general computers, and therefore will not make the user feel incongruous. Thus, no problem will occur in operation.

The following can be obtained as a secondary advantage from the embodiment:

If memory means of about 4 Mbytes is employed in the digital camera, very fine images of about 400 frames can be easily stored, even supposing that an image of one frame is data of 100 Kbytes, and the camera can function as an image memorandum when the user uses the camera to print stored images later on. However, it should be noted that the main feature of the digital camera itself does not lie in photography using a silver film, and that digital cameras are more expensive than the usual cameras.

Further, although it is considered that in video cameras, multiple still images are included in motion pictures, they are not very fine images but rough ones that do not satisfy the required quality level as memorandum images. Moreover, the video cameras themselves are still more expensive and larger than the digital cameras.

In light of this, by incorporating a memory capable of monitoring and confirming images or selectively storing the images, even the compact and cheap silver film camera system of the invention can be used as a compact camera for memorandum which will be satisfactory in various uses.

Although in the above-described embodiment, light indicative of an object and reflected from the half mirror located between the photographing lens and the movable mirror is received by the image pickup element, the location of the image pickup element is not limited to this, but may be changed such that it receives light indicative of the object and guided between the movable mirror and the eyepiece section. Furthermore, the structure may be modified such that a light receiving lens for electronic image pickup is provided in addition to the photographing lens, and the image pickup element is located behind the light receiving lens.

(Second Embodiment)

Figure 5:
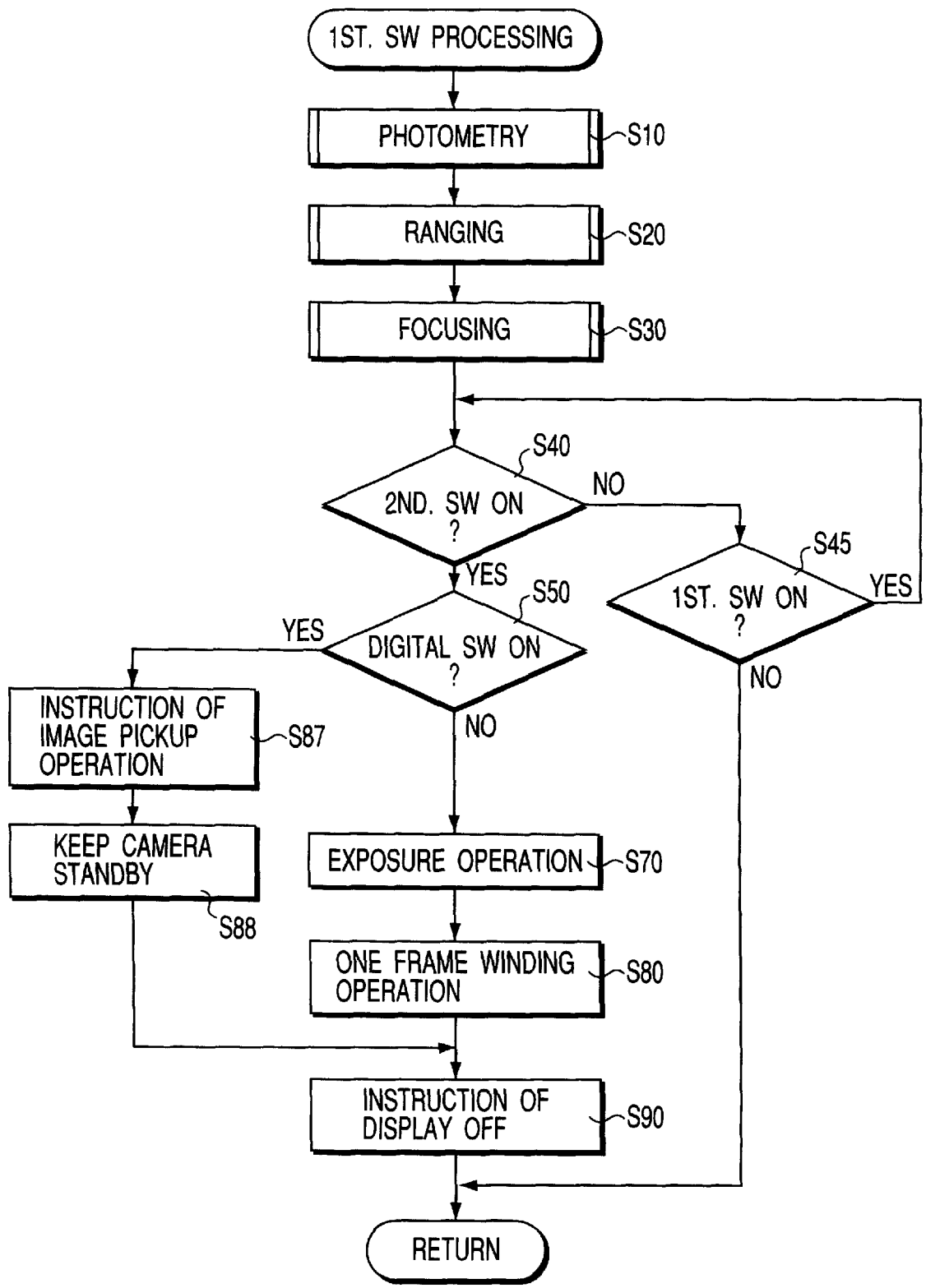
FIG. 5 is a flowchart useful in explaining the operation of a camera according to the second embodiment.

FIG. 5 is a flowchart useful in explaining the operation of a camera according to a second embodiment. When the power SW has been turned on, a control program (main routine) installed in a control circuit is executed to monitor the operation of the release button.

When the first release switch has been turned on in the main routine of the camera operation sequence (not shown), "photometry" of a to-be-photographed object is performed for photography (S10), and then "ranging" (i.e. the distance to the to-be-photographed object is measured) is performed (S20). After that, "focusing" (i.e. the lenses are driven to bring the object into focus) is performed (S30).

Subsequently, it is determined at a step S40 whether or not the second release switch is in the ON state. If the switch is in the ON state, it is determined in a step S50 whether or not the digital switch is in the ON state. If the digital switch is in the ON state, the image pickup operation (which includes a data storage operation and a display operation using the monitor) for electronic image pickup is instructed to be performed at a step S87, and then the camera is made standby for a predetermined period in time of e.g. about 1–3 sec. at a step S88. Then, the program proceeds to a step S90.

If it is determined at the step S40 that the second release switch is not in the ON state, it is determined at a step S45 whether or not the first release switch is in the ON state. If the first release switch is in the ON state, the program returns to the step S40, whereas if it is not in the ON state, the program returns to the main routine.

Further, if it is determined at the step S50 that the digital switch is not in the ON state, it is judged that only photography should be performed, thereby performing exposure of a film (S60) and then winding the film by one frame (S70). After that, the program proceeds to the step S90, where the data displayed on the monitor is deleted, and then the program returns to the main routine.

(Advantage 2)

The second embodiment can provide substantially the same advantage as the first embodiment. Moreover, according to the control program used in the monitor-equipped camera of the second embodiment, if the digital button 3b is pushed when the release button 3a is pushed by the index finger to turn on the second release switch, then, it is judged that electronic image pickup should be performed, and therefore a digital image of an object is picked up, stored for a predetermined period in time, and displayed on the monitor. If, on the other hand, the digital button 3b is not pushed, it is judged that only exposure of a film should be performed, thereby photographing the object.

As described above, as shown in FIG. 5, depending upon whether or not the digital button is pushed when the release button is pushed, one of the film exposure operation and the electronic image pickup is selected.

(Third Embodiment)

Figure 6:
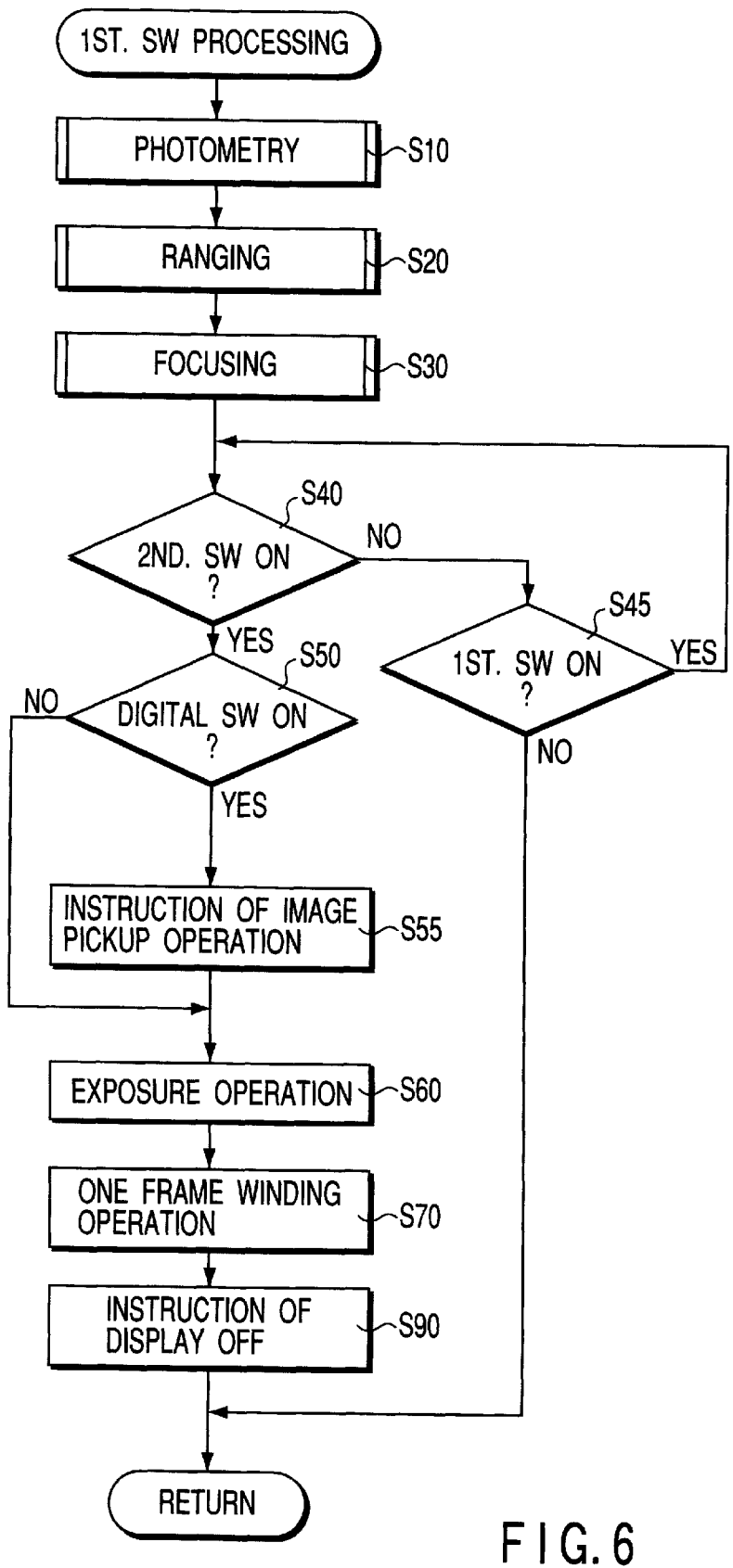
FIG. 6 is a flowchart useful in explaining the operation of a camera according to the third embodiment.

FIG. 6 is a flowchart useful in explaining the operation of a camera according to a third embodiment. When the power SW has been turned on, a control program (main routine) installed in a control circuit is executed to monitor the operation of the release button. When the first release switch has been turned on in the main routine of the camera operation sequence (not shown), "photometry" of a to-be-photographed object is performed for photography (S10), and then "ranging" of a to-be-photographed object is performed (S20). After that, "focusing" (i.e. the lenses are driven to bring the object into focus) is performed (S30).

Subsequently, it is determined at a step S40 whether or not the second release switch is in the ON state. If the switch is in the ON state, it is determined in a step S50 whether or not the digital switch is in the ON state. Only if the digital switch is in the ON state, the image pickup operation (which includes a data storage operation and a display operation using the monitor) for electronic image pickup is instructed to be performed at a step S55, followed by the program proceeding to a step S60.

If, on the other hand, it is determined at the step S40 that the second release switch is not in the ON state, it is determined at a step S45 whether or not the first release switch is in the ON state. If it is determined at the step S45 that the first release switch is in the ON state, the program returns to the step S40, whereas if the switch is not in the ON state, the program returns to the main routine.

Further, if it is determined at the step S50 that the digital switch is not in the ON state, it is judged that only photography should be performed, thereby performing exposure of a film (S60) and then winding the film by one frame (S70). After that, the program proceeds to the step S90, where the data presently displayed on the monitor is deleted and the program returns to the main routine.

(Advantage 3)

The third embodiment can provide substantially the same advantage as the first and second embodiments. Moreover, according to the control program used in the monitor-equipped camera of the third embodiment, only if the digital button 3b is pushed by the thumb when the release button 3a is pushed by the index finger to turn on the second release switch, then, first the image pickup operation and then the exposure operation is performed. If, on the other hand, the digital button 3b is not pushed, it is judged that only the exposure operation should be performed, thereby photographing the object.

As described above, as shown in FIG. 6, depending upon whether or not the digital button is pushed when the release button is pushed, it is judged whether or not the electronic image pickup should be performed, and then the film exposure operation is performed.

(Modification)

In the invention, an image of an object can be displayed on a monitor such as an LCD, using the image pickup and storage operations of an image pickup element such as a CCD. This structure may be modified such that the image pickup operation and the display operation are performed all the time, and the electronic image storage operation is controlled by pushing the release button and the digital button appropriately. Also, the continuous or intermittent display operation of the monitor may be changed by changing a set value of, for example, the waiting time.

In addition, to increase the luminance of the monitor so as to match the brightness of the surroundings when it is used outside during the day, the monitor may be modified to a backlighting type wherein an illumination device having as great a power as the battery can supply is provided on the rear surface. Also in this case, the camera may have a power saving function for, for example, appropriately interrupting the supply of power to the backlight or the entire monitor. Thus, the power required for the image pickup element can be saved, which is advantageous in light of a small battery incorporated in the compact camera. Furthermore, although in the invention, an image is stored in an image storage circuit, it may be stored in a recording medium such as a so-called "smart media" or an MD (Mini Disk).

(Other Modifications)

The locations of the release button and the digital button are not limited to the above-described ones, but may be changed as the user wishes. The monitor may be separate from the camera main body, and movably attached to the outer surface of the body.

The set (or predetermined) periods in time used in the control program can be changed within a range in which, for example, no chattering will occur on the display and/or during the operation.

In addition to the above, the invention can be modified in various manners without departing its scope.

(Advantage of the Invention)

As stated above, the invention can provide a camera in which any one of or both of the electronic image pickup operation and the silver film exposure operation can be selected using a simple mechanism.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A camera comprising:
   photographing means for exposing a silver film to light to photograph a to-be-photographed object;
   electronic image pickup means for picking up an image of the to-be-photographed object using an image pickup element, and recording the image as image data;
   a plurality of operation members including a first manual operation member and a second manual operation member different from the first operation member; and
   control means for selectively operating the photographing means and the electronic image pickup means based on an operation state of one of the first and second manual operation members assumed when the other of the first and second operation members is operated.

2. A camera according to claim 1, wherein the control means determines operation states of the photographing means and the electronic image pickup means depending upon whether or not the second manual operation member is operated when the first manual operation member is operated.

3. A camera according to claim 1, wherein:

the first manual operation means generates a first manual operation signal when it is operated;

the second manual operation means generates a second manual operation signal different from the first manual operation signal when it is operated; and the control means: (i) simultaneously operates the photographing means and the electronic image pickup means only when both the first and second manual operation signals have been output, (ii) operates the electronic image pickup means when only the first manual operation signal has been output, and (iii) operates the photographing means when the second manual operation signal has been output.

4. A camera according to claim 1, further comprising a display section for displaying the to-be-photographed object based on a signal output from the electronic image pickup means, and wherein the control means selectively executes a plurality of operations which include: (i) a first operation for photographing the object using the photographing means based on a combination of operations of the plurality of operation members, (ii) a second operation for displaying the object on the display section based on a signal output from the electronic image pickup means, and (iii) a third operation for simultaneously executing the first and second operations.

5. A camera capable of photographing a to-be-photographed object and picking up an electronic image of the object, said camera comprising:

a photographing device that exposes a silver film to light to photograph a to-be-photographed object;

an electronic image pickup device that converts an image of the to-be-photographed object into an electric signal used to display the image on a monitor;

a first manual operation member adapted to be used by a user to instruct the camera to perform photography using the silver film, and a second manual operation member adapted to be used by a user to instruct the camera to perform image pickup, said first and second manual operation members having a positional relationship adapted to correspond to the anatomy of a human hand; and control means for controlling at least one of the photographic device and the electronic image pickup device based on an operation state of one of the first and second manual operation members assumed when the other of the first and second operation members is operated.

6. A camera capable of photographing a to-be-photographed object and picking up an electronic image of the object, said camera comprising:

a photographing device that exposes a silver film to light to photograph a to-be-photographed object;

a digital image pickup device that converts an image of the to-be-photographed object into an electronic signal used to displaying the image on a monitor;

a first switch that generates a first manual operation signal, said first switch operating in synchronism with an operation of a release button that instructs photography using the silver film;

a second switch that generates a second manual operation signal, said second switch operating in synchronism with an operation of a button that instructs digital image pickup; and control means for simultaneously operating the photographing device and the digital image pickup device only when both the first and second manual operation signals have been output.

7. A camera equipped with a monitor, said camera comprising:

exposure means for exposing a silver film to light to print a to-be-photographed object on the silver film;

electronic image pickup means for converting an image of the to-be-photographed object to an electric signal;

monitor means for displaying the to-be-photographed object based on the electric signal produced by the electronic image pickup means;

a first manual operation member related to electronic image pickup, and a second manual operation member related to photography using the silver film; and control means for selectively executing, based on an operation of one of the first and second manual operation members performed when the other of the first and second manual operation members has been operated, a plurality of operations which include: (i) a first operation for photographing the object using the exposure means, (ii) a second operation for displaying the object on the monitor means, and (iii) a third operation for simultaneously executing the first and second operations.

8. A camera comprising:

a photographing mechanism that exposes a silver film to light to photograph a to-be-photographed object;

an electronic image pickup mechanism having a predetermined image pickup element that receives light indicative of the object and that records the received light as image data;

a plurality of operation members including a first manual operation member and a second manual operation member; and a controller that selectively operates the photographing mechanism and the electronic image pickup mechanism based on an operation state of one of the first and second manual operation members assumed when the other of the first and second operation members is operated.

9. A camera according to claim 8, wherein the controller determines operation states of the photographing mechanism and the electronic image pickup mechanism depending upon whether or not the second manual operation member is operated when the first manual operation member is operated.

10. A camera according to claim 8, wherein:

the first manual operation means generates a first manual operation signal when it is operated;

the second manual operation means generates a second manual operation signal different from the first manual operation signal when it is operated; and the controller simultaneously operates the photographing mechanism and the electronic image pickup mechanism only when both the first and second manual operation signals have been output, and operates the electronic image pickup mechanism when only the first manual operation signal has been output.

11. A camera according to claim 8, further comprising a display for displaying the to-be-photographed object based on a signal output from the electronic image pickup mechanism, and wherein the controller selectively executes a plurality of operations which include: (i) a first operation for photographing the object using the photographing mechanism based on a combination of operations of the plurality of operation members, (ii) a second operation for displaying the object on the display based on a signal output from the electronic image pickup operation, and (iii) a third operation for simultaneously executing the first and second operations.

* * * * *